United States Patent
Pouran Ben Veyseh et al.

(10) Patent No.: US 11,494,647 B2
(45) Date of Patent: Nov. 8, 2022

(54) SLOT FILLING WITH CONTEXTUAL INFORMATION

(71) Applicant: ADOBE INC., San Jose, CA (US)

(72) Inventors: Amir Pouran Ben Veyseh, Eugene, OR (US); Franck Dernoncourt, Sunnyvale, CA (US)

(73) Assignee: ADOBE INC., San Jose, CA (US)

( * ) Notice: Subject to any disclaimer, the term of this patent is extended or adjusted under 35 U.S.C. 154(b) by 447 days.

(21) Appl. No.: 16/706,180

(22) Filed: Dec. 6, 2019

(65) Prior Publication Data

US 2021/0174193 A1 Jun. 10, 2021

(51) Int. Cl.
*G06N 3/08* (2006.01)
*G06N 5/04* (2006.01)
(Continued)

(52) U.S. Cl.
CPC ............... *G06N 3/08* (2013.01); *G06F 3/167* (2013.01); *G06K 9/623* (2013.01); *G06K 9/6256* (2013.01);
(Continued)

(58) Field of Classification Search
CPC .......... G06N 3/08; G06N 5/046; G06N 7/005; G06N 20/10; G06N 20/20; G06N 3/0427; G06N 5/027; G06N 3/0445; G06N 3/0454; G06N 3/084; G06F 3/167; G06F 40/30; G06F 8/34; G06F 8/43; G06F 40/20; G06K 9/623; G06K 9/6256; G06K 9/6268;
(Continued)

(56) References Cited

U.S. PATENT DOCUMENTS

| 2015/0161997 A1 | 6/2015 | Wetsel et al. |
| 2015/0324686 A1* | 11/2015 | Julian ...................... G06N 3/08 706/25 |
| 2018/0137404 A1 | 5/2018 | Fauceglia et al. |

FOREIGN PATENT DOCUMENTS

| CN | 111160008 | 5/2020 |
| WO | 2020051192 | 3/2020 |

OTHER PUBLICATIONS

Examination Report dated Mar. 24, 2021 in corresponding Great Britain Application No. 2015736.8 (10 pages).
(Continued)

*Primary Examiner* — Charlotte M Baker
(74) *Attorney, Agent, or Firm* — F. Chau & Associates, LLC

(57) ABSTRACT

A system, method and non-transitory computer readable medium for editing images with verbal commands are described. Embodiments of the system, method and non-transitory computer readable medium may include an artificial neural network (ANN) comprising a word embedding component configured to convert text input into a set of word vectors, a feature encoder configured to create a combined feature vector for the text input based on the word vectors, a scoring layer configured to compute labeling scores based on the combined feature vectors, wherein the feature encoder, the scoring layer, or both are trained using multi-task learning with a loss function including a first loss value and an additional loss value based on mutual information, context-based prediction, or sentence-based prediction, and a command component configured to identify a set of image editing word labels based on the labeling scores.

20 Claims, 9 Drawing Sheets

(51) Int. Cl.
    *G06N 7/00*      (2006.01)
    *G06N 20/10*     (2019.01)
    *G06F 3/16*      (2006.01)
    *G06K 9/62*      (2022.01)
    *G06T 11/60*     (2006.01)
    *G06N 20/20*     (2019.01)

(52) U.S. Cl.
    CPC ............ *G06K 9/6268* (2013.01); *G06N 5/046* (2013.01); *G06N 7/005* (2013.01); *G06N 20/10* (2019.01); *G06N 20/20* (2019.01); *G06T 11/60* (2013.01)

(58) Field of Classification Search
    CPC ...... G06K 9/629; G06K 9/6272; G06T 11/60; G10L 15/1822; G10L 15/16; G06V 10/82; G06V 10/806
    USPC ........................................................ 706/25
    See application file for complete search history.

(56) References Cited

OTHER PUBLICATIONS

Belghazi, et al., "Mutual Information Neural Estimation", Proceedings of the 35th International Conference on Machine Learning, Stockholm, Sweden, PMLR 80, 2018, 18 pages.

Hjelm, et al., "Learning Deep Representations By Mutual Information Estimation and Maximization", published as a conference paper at ICLR 2019, arXiv:1808.06670v5 [stat.ML] Feb. 22, 2019, 24 pages.

Devlin, et al., "BERT: Pre-Training of Deep Bidirectional Transformers for Language Understanding", arXiv:1810.04805v2 [cs.CL] May 24, 2019, 16 pages.

Ravanelli, et al., "Learning Speaker Representations With Mutual Information", arXiv:1812.00271v2 [eess.AS] Apr 5, 2019, 5 pages.

Liu, et al., "GCDT: A Global Context Enhanced Deep Transition Architecture for Sequence Labeling", arXiv:1906.02437v1 [cs.CL] Jun. 6, 2019, 11 pages.

\* cited by examiner

SLOT FILLING WITH CONTEXTUAL INFORMATION

BACKGROUND

The following relates generally to image editing, and more specifically to editing images with verbal commands.

Natural language processing can be used in a wide variety of text parsing applications. For example, image editing software can receive verbal commands and make edits to images based off those commands. Slot filling refers to a natural language processing technique that involves identifying specific categories of information within a text. In the image editing example, words in a sentence may be associated with an action, an object, an attribute, and a value. These word labels may then be used to identify precise commands (i.e., commands to edit a specific attribute of an image).

In many cases, the meaning of a word may change based on the context of the word within a sentence. However, conventional slot filling techniques do not adequately account for the context of the words. This can result in misinterpretation of a verbal command, which can cause mistakes or delays in implementing the verbal commands. Therefore, there is a need in the art for slot filling techniques that incorporate word context.

SUMMARY

A system and a method for editing images with verbal commands are described. Embodiments of the system and method may include an artificial neural network (ANN) with a word embedding component configured to convert text input into a set of word vectors; a feature encoder configured to create a combined feature vector for the text input based on the word vectors; a scoring layer configured to compute labeling scores based on the combined feature vectors, wherein the feature encoder, the scoring layer, or both are trained using multi-task learning with a loss function including a first loss value and an additional loss value based on mutual information, context-based prediction, or sentence-based prediction; and a command component configured to identify a set of image editing word labels based on the labeling scores.

A system, method and non-transitory computer readable medium for training an ANN are described. Embodiments of the system, method and non-transitory computer readable medium may receive a training set comprising a plurality of text inputs and a set of target labels for each of the plurality of text inputs, generate a combined feature vector for each of the plurality of text inputs, generate a set of output labels for each of the combined feature vectors, compute a first loss value by comparing the set of output labels and the set of target labels, compute at least one additional loss value based on context information; and update the neural network based on computed first loss value and the at least one additional loss value.

A system, method and non-transitory computer readable medium for editing images with verbal commands are described. Embodiments of the system, method and non-transitory computer readable medium may receive an audible input for editing an image; convert the audible input to a text input; compute a feature vector for the text input using a neural network; compute a set of word labels based on the feature vector using the neural network, wherein the neural network is trained using multi-task learning with a loss function including a first loss value and an additional loss value based on mutual information, context-based prediction, or sentence-based prediction; identify an image editing command based on the set of word labels; and edit the image based on the image editing command.

DETAILED DESCRIPTION

Figure 1:
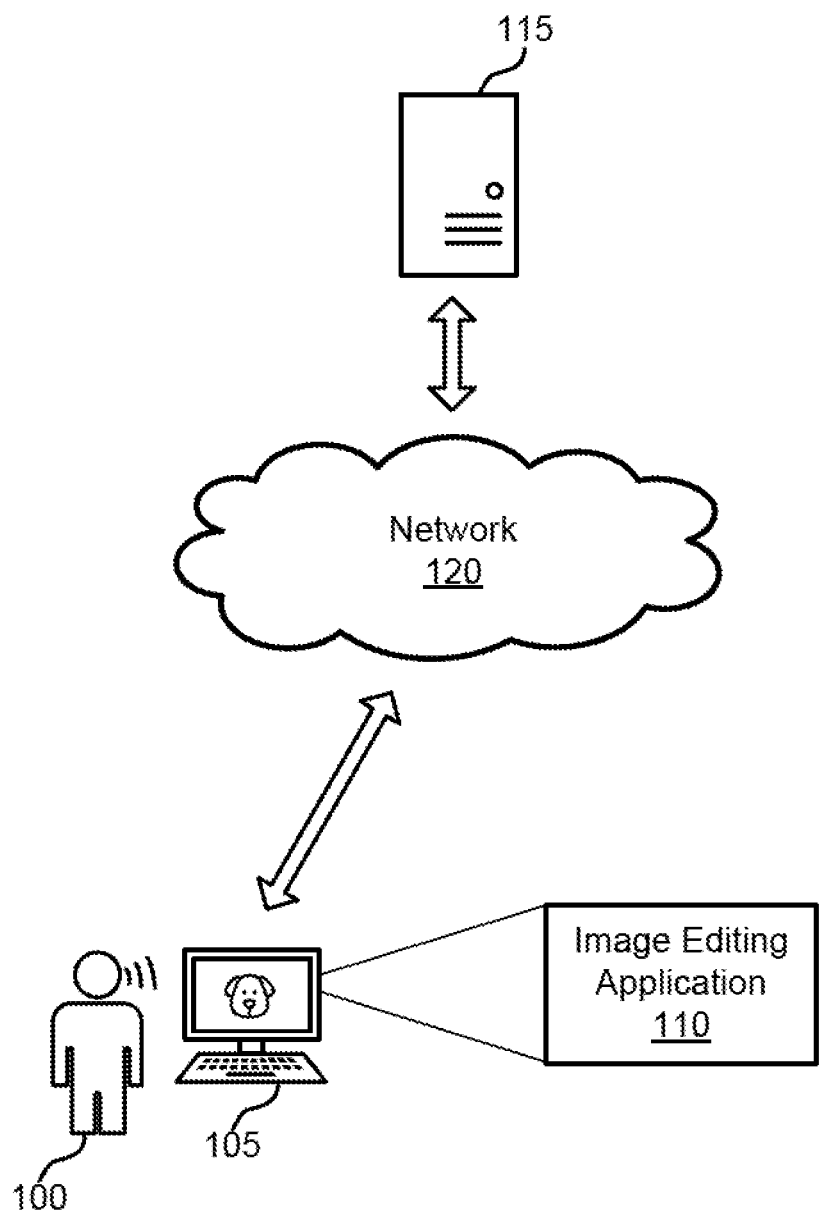
FIG. 1 shows an example of an image editing system according to aspects of the present disclosure.

The present disclosure describes systems and methods for slot filling based on word context. Slot filling refers to a natural language processing technique that identifies specific categories of information within a text. For example, a user may provide verbal commands to an image editing application, and words from the verbal command may be associated with "slots" such as an action, an object, an attribute, and a value corresponding to a desired image editing process. In this example, the "action" may refer to the type of edit; the "object" is the part of the image to be edited; the "attribute" is the aspect of the object to be changed; and the "value" is the new value for the attribute. Accurately identifying the word labels enables an image editing application to process an image based on the verbal commands.

Slot filling may be implemented using a neural network implementing sequence labeling. For example, a recurrent neural network (RNN) may be used as an encoder and a conditional random field (CRF) may be used as a decoder. The encoder may be used to extract features for each word of the input text and the decoder generates labels based on the features. Conventionally, the encoder and decoder have been trained using a single-task loss function (i.e., based solely on comparing the output of the decoder to known training data). This method may capture the meaning of each word in isolation, but word meanings may change based on the context of the word within a sentence.

For example, if a user gives the command "change the color of the house to blue," the house is the object, color is the attribute, and blue is the value. However, if the command is "change the blue house to red," the term "blue" is a modifier of the object (and in this case, the old value), not a new value for the attribute.

Thus, conventional slot filling may not adequately account for word context. Specifically, a neural network trained using a conventional single-task loss function may not capture sufficient contextual information. This can result in misinterpretation of verbal commands when words are used in a different context, which can ultimately cause mistakes or delays in implementing the commands.

Therefore, embodiments of the present disclosure use multi-task learning to ensure the utilization of contextual information in a slot-filling process (e.g., for assigning labels to individual words of an image editing command). Multiple learning tasks may be implemented by using a multiple-term loss function during training of a neural network. Specifically, the loss function may include a first value corresponding to a word-based prediction of the object label (i.e., based on comparing the output of the decoder against a known training set), and at least one additional loss value from the set including:

1) a loss value based on mutual information between encoded features and word context,
2) a loss value based on comparing a context-based prediction to the known training set, and
3) loss value based on a sentence-level prediction (i.e., a prediction regarding which labels are present in the input text).

Using a loss function including a separate term that specifically accounts for word context, in addition to a term corresponding directly to word label prediction, enhances the ability of the trained network to account for differences in word meaning that arise from the overall structure of the sentence. In addition to using multi-task learning, some embodiments use separate decoders for semantic features and contextual features.

Thus, systems and methods described herein ensures that contextual information are more fully incorporated, which results in increased accuracy when interpreting text such as an image editing command. Referring back to the example given previously, embodiments of the present disclosure may be more likely to interpret the term "blue" in the command "change the blue house to red," as a modifier of the object, and correctly identify "red" as the new value of the attribute due to its position in relation to other words in the command.

The following terms are used throughout the present disclosure.

The term "multi-task learning" refers to a machine learning technique that incorporates more than one different learning task. A learning task refers to the method of evaluating the output of the neural network model, such as a term in a loss function. Each learning task may represent a comparison of different type of output (e.g., a prediction of individual word labels, a mutual information score, or a sentence-level prediction of which word labels are present) or an output based on different input (e.g., word label predictions based on the semantic meaning of words vs. word label predictions based on structural information).

The term 'word embedding' refers to a process or component that maps words of input text to a vector space. The word embedding is based one semantic aspects of a word (i.e., the meaning). A word embedding function maps words that have similar meaning onto vectors that are close to each other in the vector space. Thus, the words 'dog' and 'hound' might be closer than 'dog' and 'doge', even though the latter pair have more letters and sounds in common.

The term 'feature encoder' refers to a process or component that encodes information of such word vectors (i.e., the output of the word embedding), sequence information, Part-of-Speech (POS) tags, etc. into a feature vector. In some embodiments, the feature encoder may include both a word encoder based on the word embedding and a structural encoder that incorporates information about sentence structure or syntax.

The terms 'word-based feature vector' and 'structure-based feature vector' refer to the output of the word encoder and the structural encoder, respectively. The output of the feature encoder may be a combined feature vector including a concatenation of the word-based feature vector and the structure-based feature vector.

The term 'scoring layer' refers to a process or component that maps encoded feature vectors to word labels or labeling scores. In some cases, the scoring layer may also be referred to as a decoder. The scores represent the likelihood that a word in an input text corresponds to a particular label such as action, object, attribute, or value. In one embodiment, the scoring layer includes a feed forward layer and a Conditional Random Field (CRF) layer.

The term 'loss function' refers to a function used in the training process of a neural network. Specifically, the parameters of a neural network are adjusted to minimize the loss function. For example, a simple loss function may be to minimize the distance between an output vector and a known training target. In another example, a loss function can be based on a Viterbi algorithm for finding a sequence of labels that produce the highest score for an input text.

In some cases, the objective represented by the loss function may be referred to as the training task. According to embodiments of the present disclosure, multi-task learning is implemented using a loss function that represents multiple training objectives related to incorporating the semantic, structural, and contextual information of an input text.

The term 'context-based feature vector' refers to a vector incorporating context of each word in a text input. For example, the context-based feature vector may be generated by max pooling over all word-based feature vectors from a text input (or a sentence of the text input) other than the word itself. The context-based feature vector may be used to perform multiple learning tasks as described below.

The term 'mutual information loss value' refers to a learning task that maximizes mutual information between a word-based feature vector and a context-based feature vector. Mutual information refers to a measure of dependence between two variables. That is, it reflects how much information one can obtain about one quantity by observing another quantity. Using a loss value based on mutual information encourages the encoder to map text inputs to vectors that have a higher level of mutual information with the context-based feature vectors.

The term 'context-based prediction loss value' refers to a learning task based directly on a context-based prediction of word labels. Making a prediction based on the context-based feature vectors may provide different results than making predictions based on the word-based feature vectors (or a combination of the word-based feature vectors and structure-based feature vectors). Therefore, including a separate learning task for context-based prediction encourages a neural network to incorporate context-based information.

The term 'sentence-level prediction loss value' refers to a learning task based on predicting which labels will appear in a sentence. For example, certain labels may appear two or more times while other labels do not appear at all. For example, in the case of image editing, a sentence may include a word corresponding to an 'action', but may not include any words corresponding to an 'attribute'. A training task based on sentence-level prediction encourages a neural network to learn parameters that take into account global information about the sentence.

FIG. 1 shows an example of an image editing system according to aspects of the present disclosure. The example shown includes user 100, terminal 105, image editing server 115, and network 120. Terminal 105 may include image editing application 110.

The user may edit an image using the image editing application 110, and may provide a verbal command to perform an action with respect to the image, or a part of the image. Image editing application 110 may receive the audible input, and convert it to a text input. The image editing application 110 may then transmit the text input to image editing server 115, which includes functions capable of interpreting the text input. According to embodiments, image editing server 115 may include a neural network trained with multiple training tasks that cause the neural network to learn parameters that incorporate both word meaning and word context when assigning labels during text interpretation.

Once the text is interpreted by the image editing server 115, one or more editing commands may be transmitted back to the image editing application 110, which may then edit the image accordingly. Image editing server 115 may be an example of, or include aspects of, the corresponding element or elements described with reference to FIG. 9. In some examples the functions described as being performed remotely at the image editing server 115 may also be performed locally at the terminal 105 (e.g., within the image editing application 110 itself). For example, in some cases labeling words of an image editing command is performed at the server 115, and in other examples, it may be performed at the terminal 105.

Thus, according to various embodiments, either the server 115 or the terminal 105 may include an artificial neural network (ANN) trained using a multi-task learning objective to label words in an image editing command. An ANN may be a hardware or a software component that includes a number of connected nodes (a.k.a., artificial neurons), which may loosely correspond to the neurons in a human brain. Each connection, or edge, may transmit a signal from one node to another (like the physical synapses in a brain). When a node receives a signal, it can process the signal and then transmit the processed signal to other connected nodes. In some cases, the signals between nodes comprise real numbers, and the output of each node may be computed by a function of the sum of its inputs. Each node and edge may be associated with one or more node weights that determine how the signal is processed and transmitted.

During the training process, these weights may be adjusted to improve the accuracy of the result (i.e., by minimizing a loss function which corresponds in some way to the difference between the current result and the target result). The weight of an edge may increase or decrease the strength of the signal transmitted between nodes. In some cases, nodes may have a threshold below which a signal is not transmitted at all. The nodes may also be aggregated into layers. Different layers may perform different transformations on their inputs. The initial layer may be known as the input layer and the last layer may be known as the output layer. In some cases, signals may traverse certain layers multiple times.

Specifically, according to embodiments of the present disclosure, the node weights of an ANN may be adjusted based on a loss function that includes multiple learning tasks representing word-based label predictions, context-based predictions, sentence-level predictions, mutual information, or any combination thereof.

Figure 2:
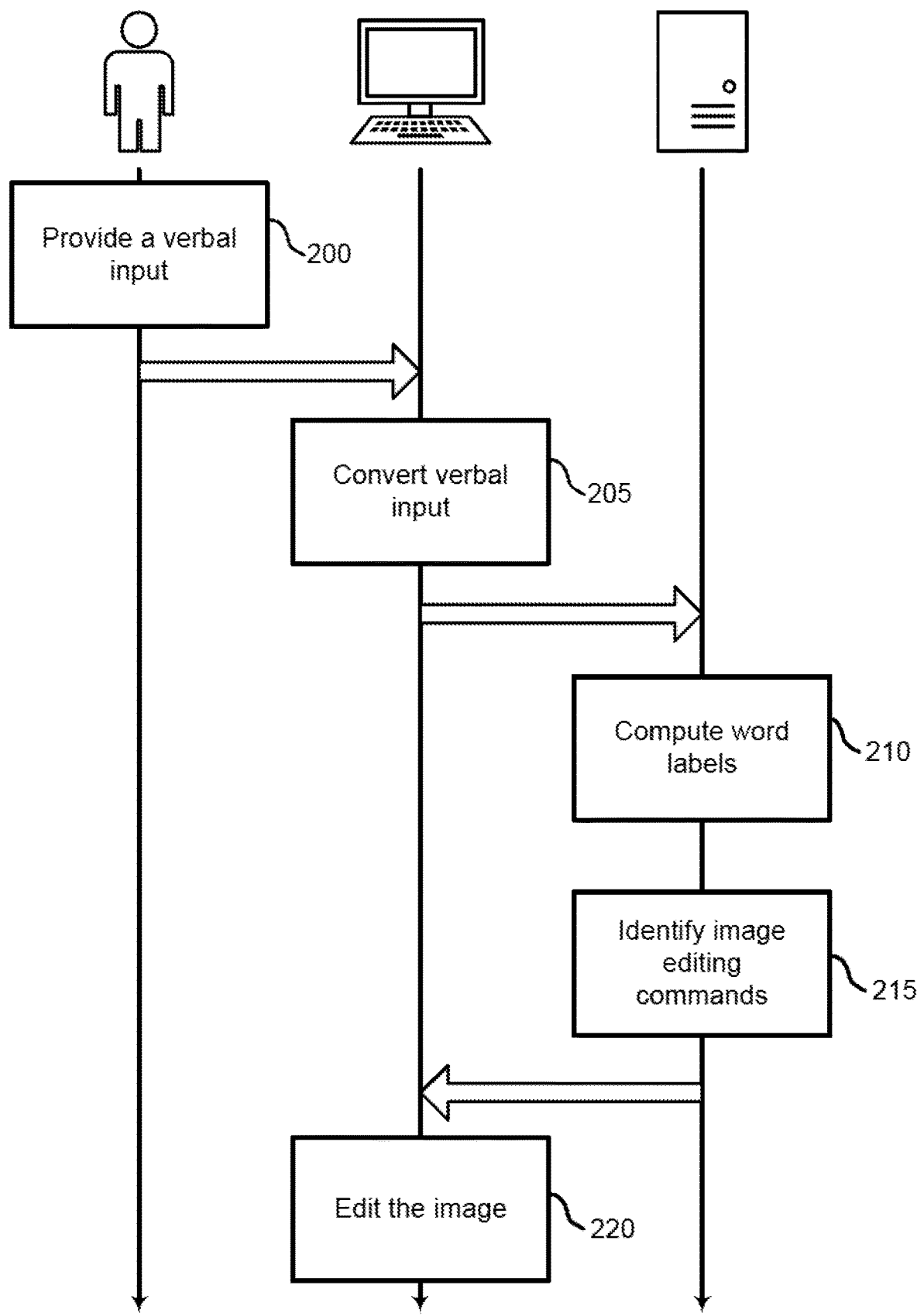
FIG. 2 shows an example of an image editing process according to aspects of the present disclosure.

FIG. 2 shows an example of an image editing process according to aspects of the present disclosure. In some examples, these operations may be performed by a computer system including a processor executing a set of codes to control functional elements of an apparatus. Additionally or alternatively, the processes may be performed using special-purpose hardware. Generally, these operations may be performed according to the methods and processes described in accordance with aspects of the present disclosure. For example, the operations may be composed of various substeps, or may be performed in conjunction with other operations described herein.

At operation 200, the user provides a verbal input (e.g., corresponding to an image editing command). At operation 205, the image editing application converts verbal input into text input. In some cases, the operations of this step may refer to, or be performed by, an image editing application as described with reference to FIG. 1.

At operation 210, the image editing server computes word labels for the text input. In some cases, the operations of this step may refer to, or be performed by, an image editing server as described with reference to FIGS. 1 and 9. Further detail regarding computing the word labels may be found herein with reference to FIGS. 3-8.

At operation 215, the image editing server or the image editing application identifies image editing commands based on the word labels. In some cases, the operations of this step may refer to, or be performed by, an image editing server as described with reference to FIGS. 1 and 9.

For example, the words of the input text may be identified as an action, object, attribute value or other. These word labels may then be associated with options available for editing the image (i.e., the action may be associated with an image editing action, the object may be associated with an object or image to be edited, the attribute may be associated with an aspect of the image or object to be edited, and the value may be associated with a new value for the attribute that will be edited.

At operation 220, the image editing application edits the image based on the editing commands. For example, an attribute (i.e., a position, shape, form, or any other suitable object attribute) of an object may be changed in the way indicated by the command to a new value indicated by the command. In some cases, the operations of this step may refer to, or be performed by, an image editing application as described with reference to FIG. 1.

Figure 3:
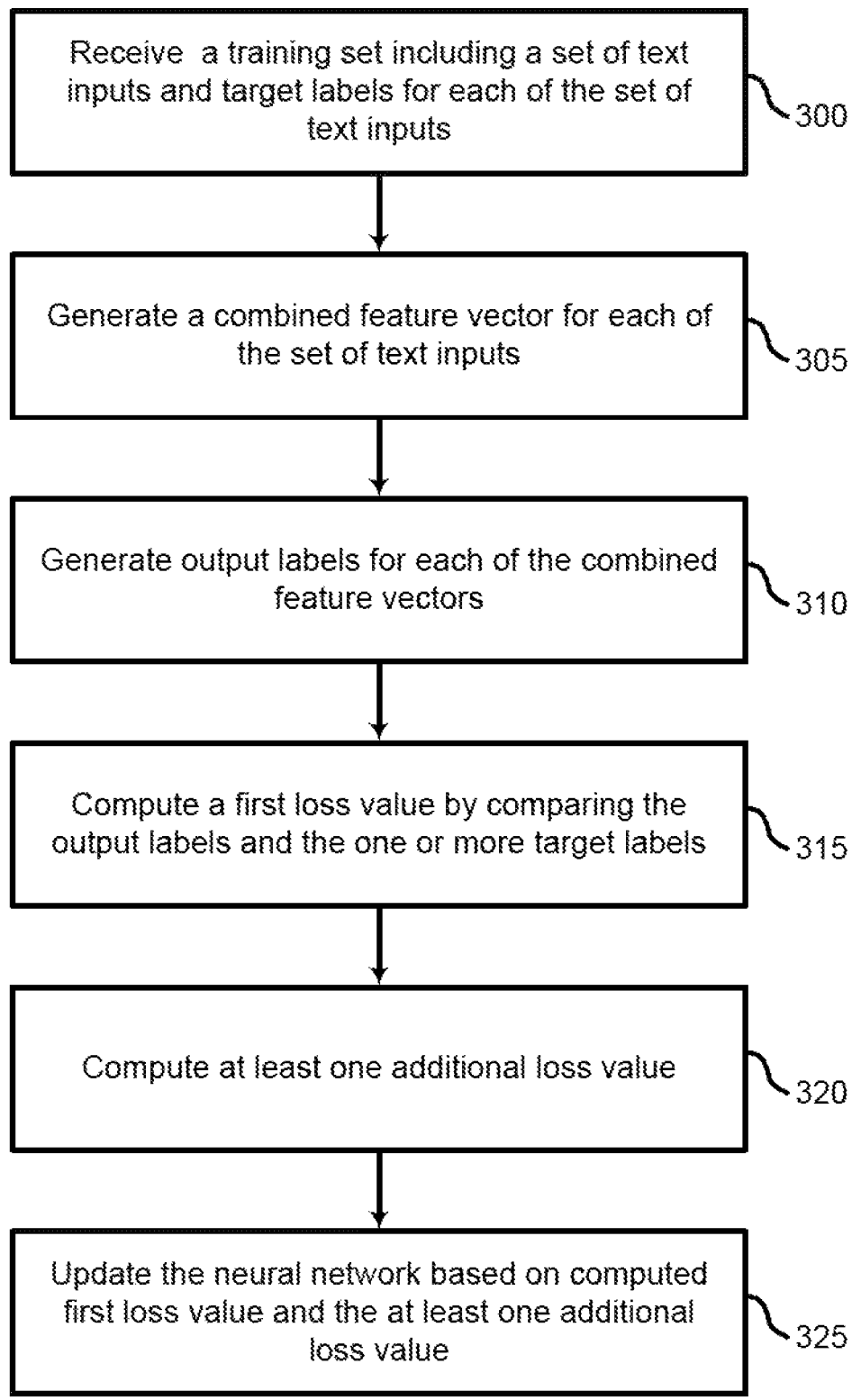
FIG. 3 shows an example of a process for classifying text according to aspects of the present disclosure.

FIG. 3 shows an example of a process for classifying text according to aspects of the present disclosure. In some examples, these operations may be performed by a system, such as the image editing server described with reference to FIGS. 1 and 9, including a processor executing a set of codes to control functional elements of an apparatus. Additionally or alternatively, the processes may be performed using special-purpose hardware. Generally, these operations may be performed according to the methods and processes described in accordance with aspects of the present disclosure. For example, the operations may be composed of various substeps, or may be performed in conjunction with other operations described herein.

At operation 300, the system receives a training set including a set of text inputs and a set of target labels for each of the set of text inputs. In some cases, the operations of this step may refer to, or be performed by, an input component as described with reference to FIG. 9.

At operation 305, the system generates a combined feature vector for each of the set of text inputs. In some cases, the operations of this step may refer to, or be performed by, a feature encoder as described with reference to FIG. 9. Further detail regarding generating the combined feature vector is described with reference to FIG. 4.

At operation 310, the system generates a set of output labels for each of the combined feature vectors. In some cases, the operations of this step may refer to, or be performed by, a scoring layer as described with reference to FIG. 9. Further detail regarding the scoring is described with reference to FIG. 5.

At operation 315, the system computes a first loss value by comparing the set of output labels and the set of target labels. In some cases, the operations of this step may refer to, or be performed by, a training component as described with reference to FIG. 9.

At operation 320, the system computes at least one additional loss value including at least one of: a mutual information loss value based on comparing mutual information between the combined feature vectors and corresponding context-based feature vectors, a context-based prediction loss value based on comparing context-based output labels and the target labels, or a sentence-level prediction loss value based on comparing predicted label sets present in each of the text inputs with known label sets based on the target labels. In some cases, the operations of this step may refer to, or be performed by, a sentence-based prediction component as described with reference to FIG. 9.

Further detail regarding the mutual information loss value is described with reference to FIG. 6. Further detail regarding the context-based prediction loss value is described with reference to FIG. 7. Further detail regarding the sentence-level prediction loss value is described with reference to FIG. 8.

At operation 325, the system updates the neural network based on computed first loss value and the at least one additional loss value. In some cases, the operations of this step may refer to, or be performed by, a training component as described with reference to FIG. 9.

Encoding

Figure 4:
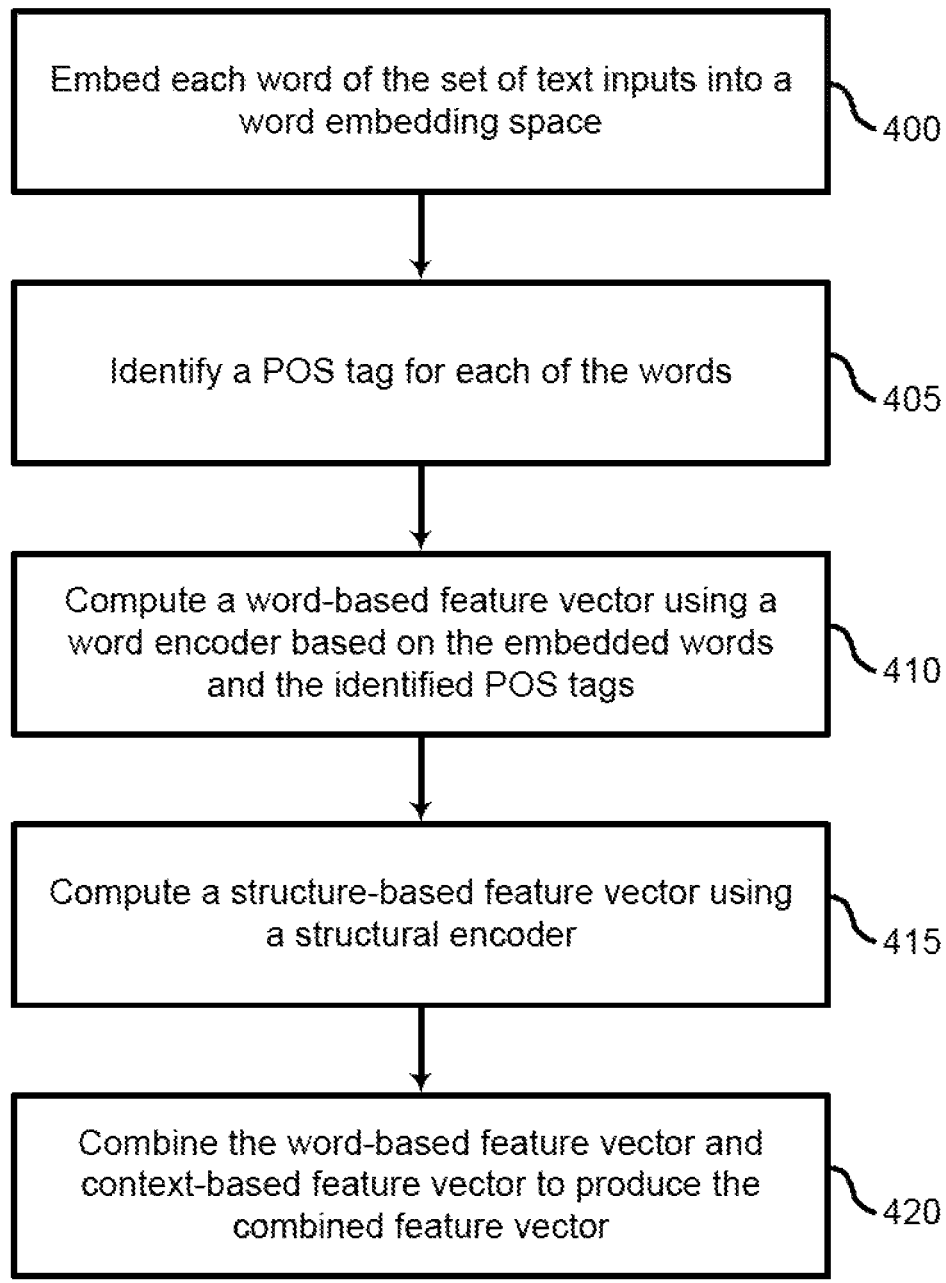
FIG. 4 shows an example of a process for generating a combined feature vector according to aspects of the present disclosure.

FIG. 4 shows an example of a process for generating a combined feature vector according to aspects of the present disclosure. The term "combined" refers to the presence of both semantic and structural features in at least some embodiments of the present disclosure.

In some examples, operations of FIG. 4 may be performed by a system, such as the terminal or the image editing server described with reference to FIGS. 1 and 9, including a processor executing a set of codes to control functional elements of an apparatus. Additionally or alternatively, the processes may be performed using special-purpose hardware. Generally, these operations may be performed according to the methods and processes described in accordance with aspects of the present disclosure. For example, the operations may be composed of various substeps, or may be performed in conjunction with other operations described herein.

A sequence of words $x_1, x_2, \ldots, x_n$ may be used as input for the encoder that generates the feature vector. Each word of the input is to be assigned a label. In the image editing example, the labels can include 'action,' 'object,' 'attribute', and 'value' labels. In some cases, some of the labels are not used in every sentence. In some embodiments, beginning/inside/outside (BIO), part-of-speech (POS) tags, dependency trees or other syntax information may also be incorporated.

Each input word $x_i$ may be represented by the concatenation of a pre-trained word embedding and a syntax or POS tag embedding, denoted by $e_i$. The word $x_i$ and syntax information $e_i$ may then be used as input to an encoder including a word encoder, a structural encoder, or both.

For the word encoder, a 2-layer Bi-Directional Long Short-Term Memory (LSTM) may be applied to obtain feature vector $h_i$ (i.e., the word-based feature vector). For the structural encoder, a dependency tree may be used to encode syntactical information about the input text. The syntactical information can be used to identify words, and dependents of words, in the sentence. A syntactic tree may be modeled using a Graph Convolutional Network (GCN) instead of the dependency tree. In the contextualized representation, each word is contextualized by neighboring words. A 2-layer GCN may be used with $h_i$ as the initial representation for each node (i.e. word). The representation of the ith node is an aggregation of the representations of neighboring words. The hidden representations of the ith word in lth layer of GCN may be obtained by:

$$\hat{h}_N^l(i) = W_l * \Sigma_{j \in N(i)} \hat{h}_j^{l-1} \tag{1}$$

and $$\hat{h}_i^l = \text{ReLU}\left(\frac{\text{SUM}\left(\hat{h}_{N(i)}^l, W_l, \hat{h}_i^{l-1}\right)}{\deg(i)}\right) \tag{2}$$

where $N(i)$ is the neighbors of the ith word in the dependency tree, $W_l$ is the weight matrix in lth layer, and $\deg(i)$ is the degree of the ith word in the dependency tree. The biases are omitted for brevity. The final representations of the GCN for ith word, $\hat{h}_i$, represent the structural features for that word. The structural features $\hat{h}_i$ (i.e., the structure-based feature vector) and sequential features $h_i$ are concatenated to represent ith word by feature vector $h_i'$:

$$h_i' = \text{CONCAT}(h_i, \hat{h}_i) \tag{3}$$

Thus, at operation 400, the system embeds each word of the set of text inputs into a word embedding space (i.e., to create $x_1, x_2, \ldots, x_n$). In some cases, the operations of this step may refer to, or be performed by, a word embedding component as described with reference to FIG. 9. In some embodiments, the word embedding component may implement a word embedding such as Word2Vec, GloVe, or FastText.

At operation 405, the system identifies a POS tag for each of the words. In some cases, the operations of this step may refer to, or be performed by, a word embedding component as described with reference to FIG. 9.

At operation 410, the system computes a word-based feature vector using a word encoder based on the embedded words and the identified POS tags (e.g., $h_i$). In some cases, the operations of this step may refer to, or be performed by, a word encoder as described with reference to FIG. 9.

At operation 415, the system computes a structure-based feature vector using a structural encoder (e.g., $\hat{h}_i$). In some cases, the operations of this step may refer to, or be performed by, a structural encoder as described with reference to FIG. 9.

At operation 420, the system combines the word-based feature vector and context-based feature vector to produce the combined feature vector (e.g., $h_i'$). In some cases, the operations of this step may refer to, or be performed by, a feature encoder as described with reference to FIG. 9.

Word-Based Prediction

Figure 5:
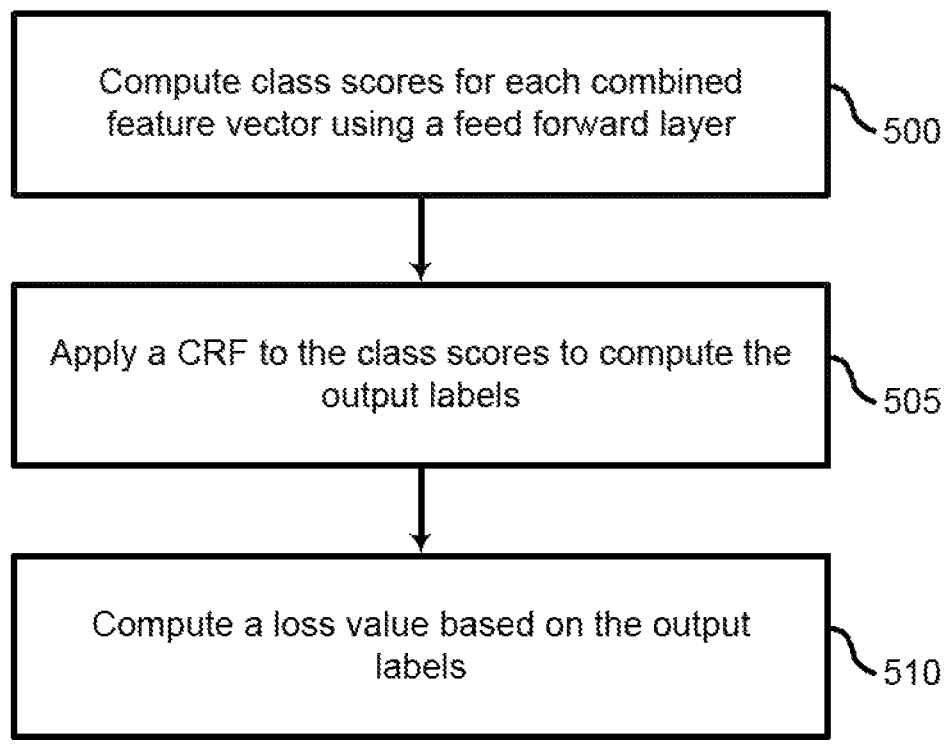
FIG. 5 shows an example of a process for computing a loss value according to aspects of the present disclosure.

FIG. 5 shows an example of a process for computing a loss value according to aspects of the present disclosure. The loss value described in FIG. 5 describes a loss value based on word-level label prediction computed based on the output of a decoder (e.g., which takes the feature vector computed in FIG. 4 as input).

In some examples, these operations may be performed by a system, such as the image editing server described with reference to FIGS. 1 and 9, including a processor executing a set of codes to control functional elements of an apparatus. Additionally or alternatively, the processes may be performed using special-purpose hardware. Generally, these operations may be performed according to the methods and processes described in accordance with aspects of the present disclosure. For example, the operations may be composed of various substeps, or may be performed in conjunction with other operations described herein.

Once the word-based features and the context-based (or structure-based) features are identified, a task-specific 2-layer feed forward neural net may be used to label the words. Subsequently, a logistic regression may be used to generate class scores $S_i$:

$$S_i = W_{LR} * (W_2 * (W_1 * h_i')) \quad (4)$$

where $W_{LR}$, $W_1$, and $W_2$ are trainable parameters. $S_i$ is a vector with a number of classes, where each dimension of the vector is associated with a score for a corresponding class.

For sequence labeling, a Conditional Random Field (CRF) may be used as a final layer to predict the sequence of labels for a given sentence. Class scores $S_i$ are provided to the CRF layer as emission scores to obtain the final labeling score:

$$\text{Score}(\hat{l}_1, \hat{l}_2, \ldots, \hat{l}_n | w_1, w_2, \ldots, w_n, \theta) = \Sigma_{j=1}^{N} (S_j + T_{j-1,j}) \quad (5)$$

where T is the trainable transition matrix and $\theta$ is the parameter used to generate emission scores $S_i$. Viterbi loss $L_{VB}$ is used as the final loss function to be optimized during training. In the inference time, the Viterbi decoder may be employed to find the sequence of labels with the highest score.

Thus, at operation 500, the system computes class scores for each combined feature vector using a feed forward layer (e.g., $S_i$). In some cases, the operations of this step may refer to, or be performed by, a scoring layer as described with reference to FIG. 9.

At operation 505, the system applies a Conditional Random Field (CRF) to the class scores to compute the set of output labels (e.g., Score). In some cases, the operations of this step may refer to, or be performed by, a scoring layer as described with reference to FIG. 9.

At operation 510, the system computes a loss value based on the set of output labels (e.g., using a Viterbi algorithm). In some cases, the operations of this step may refer to, or be performed by, a training component as described with reference to FIG. 9.

Mutual Information

Figure 6:
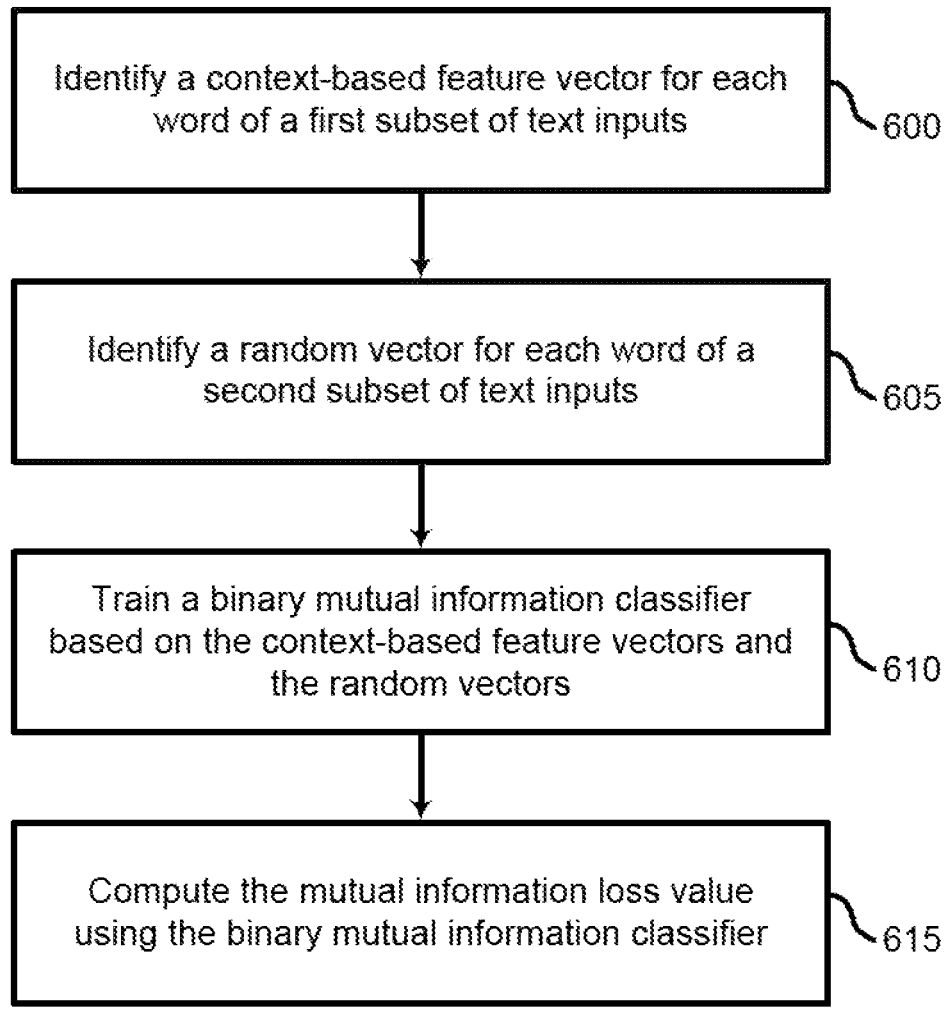
FIG. 6 shows an example of a process for computing a loss value based on mutual information according to aspects of the present disclosure.

FIG. 6 shows an example of a process for computing a loss value based on mutual information according to aspects of the present disclosure. In some examples, these operations may be performed by a system, such as the image editing server described with reference to FIGS. 1 and 9, including a processor executing a set of codes to control functional elements of an apparatus. Additionally or alternatively, the processes may be performed using special-purpose hardware. Generally, these operations may be performed according to the methods and processes described in accordance with aspects of the present disclosure. For example, the operations may be composed of various substeps, or may be performed in conjunction with other operations described herein.

Additional training subtasks may increase the consistency of the word representation and context representation of the word. For some learning tasks, max pooling over the words of a sentence (excluding the word itself) may be used to obtain the context of each word (i.e., the context-based feature vector):

$$h_i^c = MaxPooling\left(h_1, h_2, \ldots, \frac{h_N}{h_i}\right) \quad (6)$$

where $h_i$ is the representation of the ith word from the word encoder.

Accuracy may be increased by increasing the consistency between vectors $h_i$ and $h_i^c$. One method of increasing consistency is to decrease the distance between the vectors. However, directly reducing the distance between word representation and context representation may not be efficient in long or complex sentences, as the context may substantially differ from the word. Thus, some embodiments of the disclosure use a more indirect method.

Thus, at operation 600, the system identifies a context-based feature vector for each word of a first subset of text inputs (e.g., $h_i^c$). In some cases, the operations of this step may refer to, or be performed by, a mutual information component as described with reference to FIG. 9.

Specifically, mutual information between the word representation and context of the word in the loss function may be maximized. The mutual information may use the quantity of information known about a random variable, if the value of another variable is revealed. The mutual information between two random variables may be calculated using:

$$MI(X_1, X_2) = \int_{X_1} \int_{X_2} P(X_1, X_2) * \log \frac{P(X_1, X_2)}{P(X_1) P(X_2)} dX_1 dX_2 \quad (7)$$

The mutual information equation may be reformulated as KL Divergence between the joint distribution $P_{X_1 X_2} = P(X_1, X_2)$ and the product of marginal distributions $P_{X_1 \otimes X_2} = P(X_1) P(X_2)$:

$$MI(X_1, X_2) = D_{KL}(P_{X_1 X_2} \| P_{X_1 \otimes X_2}) \quad (8)$$

The mutual information between two random variables (i.e., the KL-Divergence in equation 8) may be increased if the two random variables are dependent. The representations $h_i$ and $h_i^c$ have shared information. The mutual information may be introduced directly into the loss function for optimization.

In some cases, introducing the mutual information directly into the loss function may be computationally intensive, due to the computation of high dimensional continuous vectors such as $h_i$ and $h_i^c$. Thus, computational limitations may be addressed by employing a mutual information neural estimation (MINE). The MINE may estimate a lower bound of the mutual information between the high dimensional vectors via adversarial training. The MINE may also compute the lower bound of the KL divergence between the joint and marginal distributions of the given high dimensional vectors or variables. MINE computes the lower bound of the Donsker-Varadhan representation of KL-Divergence:

$$D_{KL}(P_{X_1 X_2} \| P_{X_1 \otimes X_2}) = \sup_{T:\Omega \to \mathbb{R}} \mathbb{E}_{P_{X_1 X_2}}[T] = \log(\mathbb{E}_{P_{X_1 \otimes X_2}}[e^T]) \quad (9)$$

Other divergence metrics may also be used, offering methods to compute the lower bound for the MI. Consequently, an adversarial approach may be applied to obtain the MI lower bound, via binary cross-entropy of a variable discriminator. This discriminator differentiates between variables that are sampled from a joint distribution. The variables are sampled from the product of the marginal distributions.

The variables may include the word representation $h_i$ and context representation $h_i^c$. To sample from joint distributions, $h_i$ and $h_i^c$ (i.e., the positive example) are concatenated. The representation $h_i$ with $h_j^c$ where i≠j (i.e., the negative example) may be concatenated to sample from the product of the marginal distributions. Samples may be provided to a 2-layer feed forward neural network D (i.e., the discriminator) to perform a binary classification (i.e., coming from the joint distribution or the product of the marginal distributions). The following binary cross-entropy loss is used to estimate the mutual information between $h_i$ and $h_i^c$ to add into the overall loss function:

$$L_{disc} = \frac{1}{N} \sum_{i=1}^{N} -(\log(D[[h, h_i^c]) + \log(1 - D([h_i, h_j^c]))) \quad (10)$$

where j≠i and j∈{1, 2, ..., N}, and N is the length of the sentence and $[h, h_i^c]$ is the concatenation of the two vectors h and $h_i^c$. This value is provided to the final loss function.

Thus, at operation 605, the system identifies a random vector for each word of a second subset of text inputs. In some cases, the operations of this step may refer to, or be performed by, a mutual information component as described with reference to FIG. 9.

At operation 610, the system trains a binary mutual information classifier based on the context-based feature vectors (e.g., $h_i^c$) and the random vectors (e.g., $h_i$). In some cases, the operations of this step may refer to, or be performed by, a mutual information component as described with reference to FIG. 9.

At operation 615, the system computes the mutual information loss value (e.g., $L_{disc}$) using the binary mutual information classifier. In some cases, the operations of this step may refer to, or be performed by, a mutual information component as described with reference to FIG. 9.

Context-Based Prediction

Figure 7:
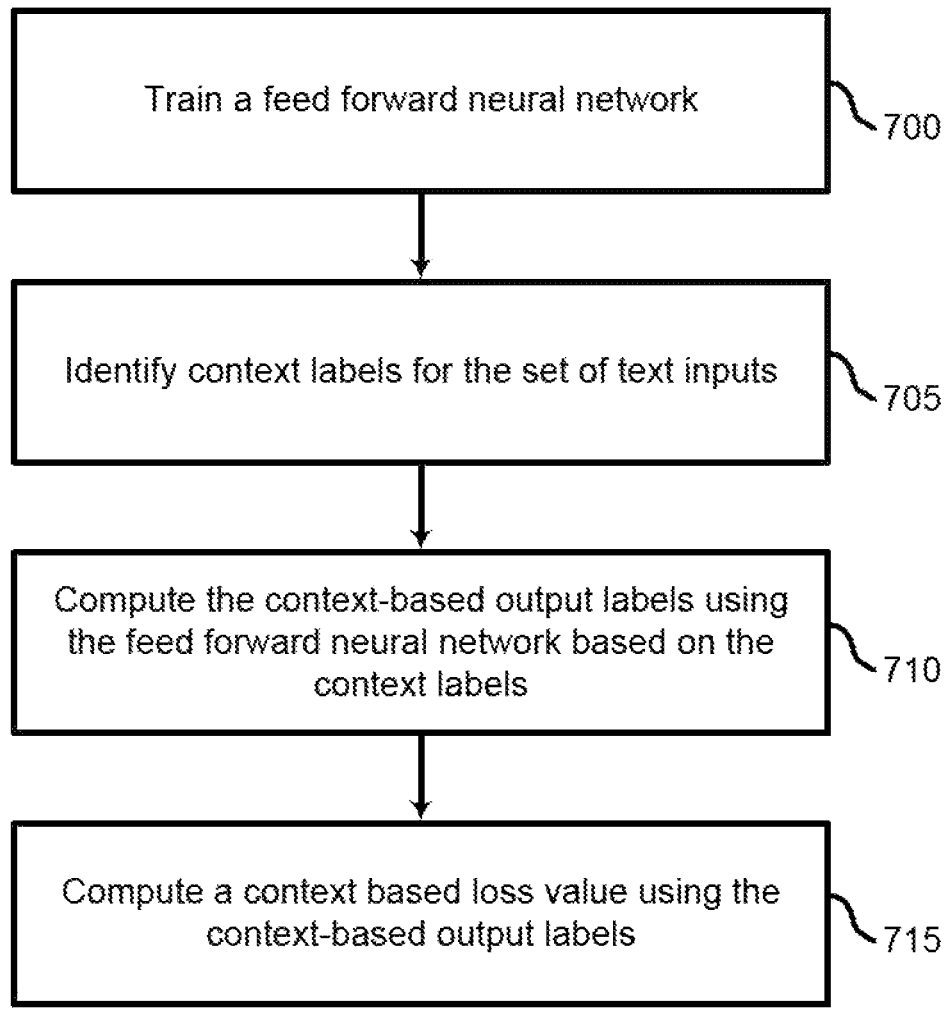
FIG. 7 shows an example of a process for computing a context-based loss value according to aspects of the present disclosure.

FIG. 7 shows an example of a process for computing a context-based loss value according to aspects of the present disclosure. In some examples, these operations may be performed by a system, such as the image editing server described with reference to FIGS. 1 and 9, including a processor executing a set of codes to control functional elements of an apparatus. Additionally or alternatively, the processes may be performed using special-purpose hardware. Generally, these operations may be performed according to the methods and processes described in accordance with aspects of the present disclosure. For example, the operations may be composed of various substeps, or may be performed in conjunction with other operations described herein.

In addition to using mutual information between the context and the word representation, the context of each word may be used to predict the label of that word. Predicting labels based on the context alone may result in increased information encoded in the context of the word with respect to the label of the word. The context vector $h_i c$ for the ith word described above may be used to predict the label. This context-based feature vector may be provided to a 2-layer feed forward neural network with a softmax layer at the end to output probabilities for each class:

$$P_i\left(\cdot \mid \frac{\{x_1, x_2, \ldots, x_n\}}{x_i}\right) = \text{softmax}(W_2 * (W_1 * h_i^c)) \quad (11)$$

where $W_2$ and $W_1$ are trainable parameters. Biases are omitted for brevity.

The following cross-entropy loss function may be optimized during training:

$$L_{WP} = \frac{1}{N} \sum_{i=1}^{N} -\log(P_i (l_i \mid \{x_1, x_2, \ldots, x_n\}/x_i)) \quad (12)$$

where N is the length of the sentence and $l_i$ is the label of the ith word.

Thus, at operation 700, the system trains a feed forward neural network. In some cases, the operations of this step may refer to, or be performed by, a context-based prediction component as described with reference to FIG. 9.

At operation 705, the system identifies context-based feature vectors for the set of text inputs (e.g., $h_i^c$). In some cases, the operations of this step may refer to, or be performed by, a context-based prediction component as described with reference to FIG. 9.

At operation 710, the system computes the context-based output labels using the feed forward neural network based on the context labels (e.g., the probabilities for each class described above). In some cases, the operations of this step may refer to, or be performed by, a context-based prediction component as described with reference to FIG. 9.

At operation 715, the system computes a context based loss value using the context-based output labels (e.g., $L_{WP}$). In some cases, the operations of this step may refer to, or be performed by, a context-based prediction component as described with reference to FIG. 9.

Sentence-Level Prediction

Figure 8:
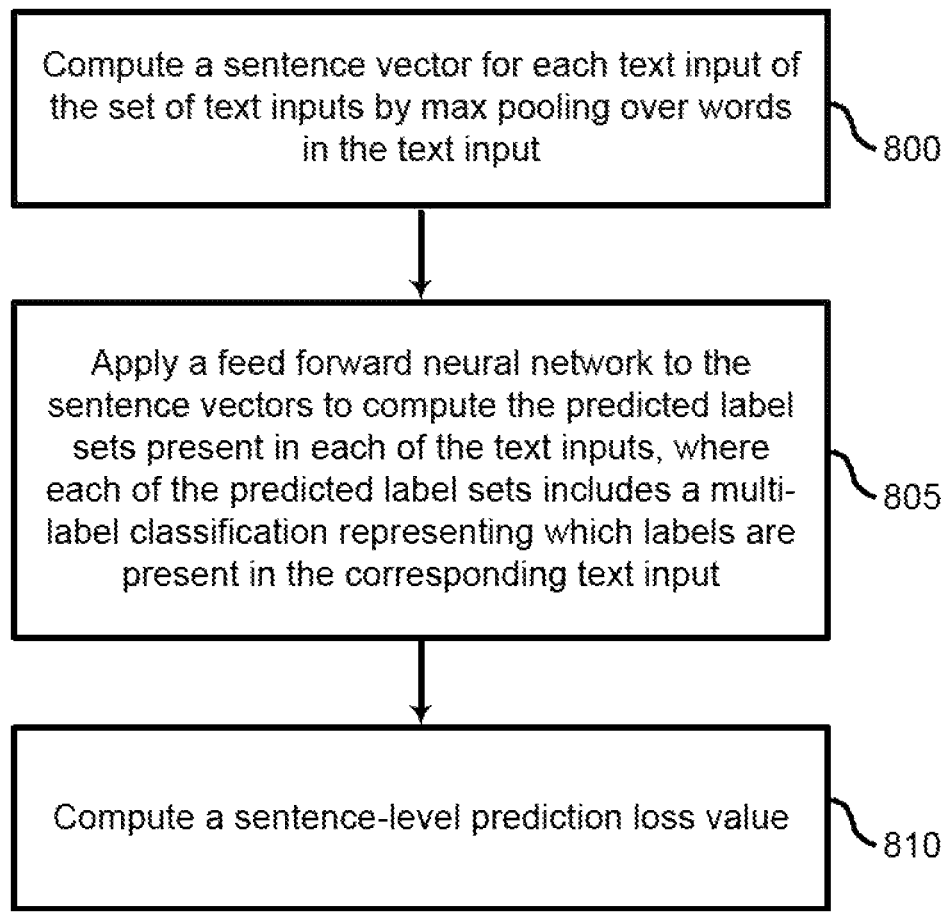
FIG. 8 shows an example of a process for computing a sentence-level prediction loss value according to aspects of the present disclosure.

FIG. 8 shows an example of a process for computing a sentence-level prediction loss value according to aspects of the present disclosure. In some examples, these operations may be performed by a system, such as the image editing server described with reference to FIGS. 1 and 9, including a processor executing a set of codes to control functional elements of an apparatus. Additionally or alternatively, the processes may be performed using special-purpose hardware. Generally, these operations may be performed according to the methods and processes described in accordance with aspects of the present disclosure. For example, the operations may be composed of various substeps, or may be performed in conjunction with other operations described herein.

The context-based prediction uses the context of each word to contain information about a label, but the label may not ensure the contextual information will capture the sentence level patterns for expressing intent. In other words, the word-level prediction may lack a general view of the entire sentence.

Predicting the labels in a sentence from the representations of the words of the sentence may increase general information about the sentence in the representation of the words. Thus, a learning task may be used to predict which labels exit in a sentence (Note that sentences may have a subset of the labels, e.g. action and object). The sentence-level prediction task may be formulated as a multi-class classification problem. Given the equation $X=x_1, x_2, \ldots, x_N$ and label set S={action, attribute, object, value}, the method may predict vector $L^S = l_1^s, l_2^s, \ldots, l_{|S|}^s$ where $l_i^s$ is equal to one if the sentence X contains ith label from the label set S, otherwise $l_i^s$ is zero.

Representation of the sentence from the word representations is determined. Max pooling over a number of words of a sentence may be used to obtain vector H:

$$H = \text{MaxPooling}(h_1, h_2, \ldots, h_N) \quad (13)$$

The vector H is further abstracted by a 2-layer feed forward neural net using a sigmoid function at the end:

$$P_i(.|x_1, x_2, \ldots, x_N) = \sigma(W_2 * (W_1 * H)) \quad (14)$$

where $W_2$ and $W_1$ are trainable parameters. Note that since the sub-task is a multi-class classification, the number of neurons at the final layer is equal to ISI. The following binary cross-entropy loss function is optimized:

$$L_{SP} = \frac{1}{|S|} \sum_{k=1}^{|S|} -(l_k * \log(P(l_k | x_1, x_2, \ldots, x_N)) + (1 - l_k) * \log(1 - P(l_k | x_1, x_2, \ldots, x_N))) \quad (15)$$

where $l_k$ is equal to one if the sentence contains the kth label, otherwise $l_k$ is zero.

Thus, according to one embodiment, multi-task training may be based on a combination of the Viterbi score (as described with reference to FIG. 5), the mutual information value (as described with reference to FIG. 6), the context-based prediction (as described with reference to FIG. 7), and the sentence-level label prediction:

$$L = L_{VB} \alpha L_{disr} + \beta L_{WP} \gamma L_{SP} \quad (16)$$

where $\alpha$, $\beta$, and $\gamma$ are tunable hyperparameters. In other embodiments, only two or three of the tasks may be used, in any combination.

Thus, at operation 800, the system computes a sentence vector for each text input of the set of text inputs by max pooling over words in the text input. In some cases, the operations of this step may refer to, or be performed by, a sentence-based prediction component as described with reference to FIG. 9.

At operation 805, the system apply a feed forward neural network to the sentence vectors to compute the predicted label sets present in each of the text inputs, where each of the predicted label sets includes a multi-label classification representing which labels are present in the corresponding text input. In some cases, the operations of this step may refer to, or be performed by, a sentence-based prediction component as described with reference to FIG. 9.

At operation 810, the system computes a sentence-level prediction loss value (e.g., $L_{SP}$). The final loss value may be based on the sentence-level prediction value (or the mutual information loss value, or context-based prediction loss value, or any combination of these).

Figure 9:
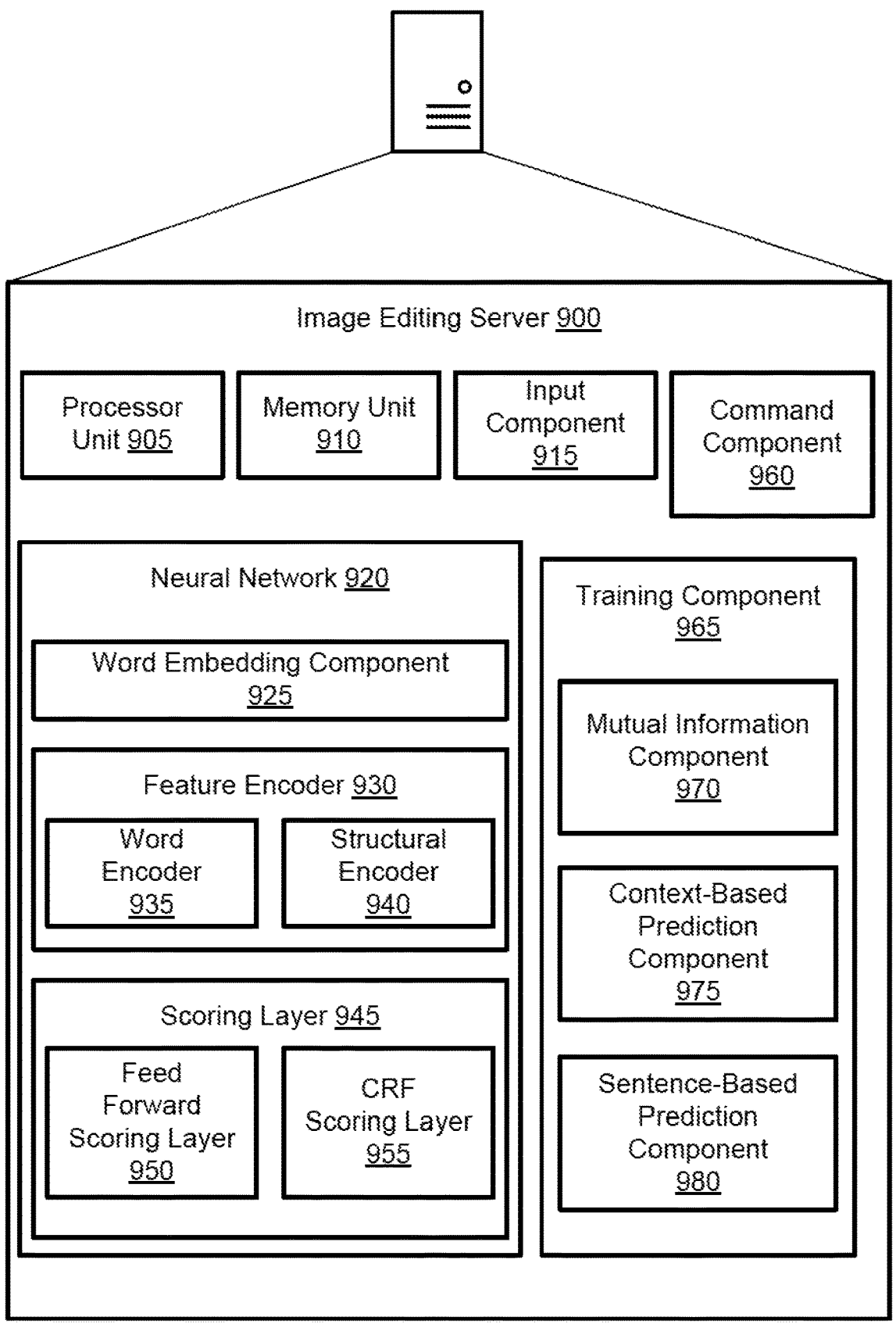
FIG. 9 shows an example of an image editing server according to aspects of the present disclosure.

FIG. 9 shows an example of an image editing server 900 according to aspects of the present disclosure. Image editing server 900 may be an example of, or include aspects of, the corresponding element or elements described with reference to FIG. 1. Image editing server 900 may include processor unit 905, memory unit 910, input component 915, neural network 920, command component 960, and training component 965.

A processor unit 905 may include an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof). In some cases, the processor may be configured to operate a memory array using a memory controller. In other cases, a memory controller may be integrated into processor. The processor may be configured to execute computer-readable instructions stored in a memory to perform various functions. In some examples, a processor may include special purpose components for modem processing, baseband processing, digital signal processing, or transmission processing. In some examples, the processor may comprise a system-on-a-chip.

A computer memory unit 910 may store information for various programs and applications on a computing device. For example, the storage may include data for running an operating system. The memory may include both volatile memory and non-volatile memory. Volatile memory may random access memory (RAM), and non-volatile memory may include read-only memory (ROM), flash memory, electrically erasable programmable read-only memory (EEPROM), digital tape, a hard disk drive (HDD), and a solid state drive (SSD). Memory may include any combination of readable and/or writable volatile memories and/or non-volatile memories, along with other possible storage devices.

Input component 915 may be configured to receive a text input. Input component 915 may also receive a training set including a set of text inputs and a set of target labels for each of the set of text inputs.

Neural network 920 may compute a combined feature vector for the text input and identify a set of word labels for words. In some examples, the neural network (including the feature encoder 930 and the scoring layer 945) is trained using multi-task learning with a loss function including a first loss value and an additional loss value based on mutual information, context-based prediction, or sentence-based prediction. Neural network 920 may include word embedding component 925, feature encoder 930, and scoring layer 945.

Word embedding component 925 may be configured to convert the text input into a set of word vectors. Word embedding component 925 may also identify a POS tag for each of the words. In some examples, the set of word vectors include semantic information and POS information. Word embedding component 925 may embed each word of the set of text inputs into a word embedding space.

Feature encoder 930 may be configured to create a combined feature vector for the text input based on the word vectors. For example, feature encoder 930 may generate a combined feature vector for each of the set of text inputs. Feature encoder 930 may combine the word-based feature vector and context-based feature vector to produce the combined feature vector. Feature encoder 930 may include a 2-layer feed forward neural network 920 and a logistic regression model.

Feature encoder 930 may include word encoder 935 and structural encoder 940.

In some examples, a word encoder 935 is configured to compute a word-based feature vector. In some examples, the word encoder 935 includes a 2-layer bi-directional Long Short Term Memory (LSTM). Word encoder 935 may compute a word-based feature vector based on the embedded words and the identified POS tags. In some examples, the word encoder 935 includes a sequential encoder.

In some examples, a structural encoder 940 configured to compute a structure-based feature vector, where the combined feature vector includes the word-based feature vector and the structure-based feature vector. In some examples, the structural encoder 940 includes a Graph Convolutional Network (GCN).

Scoring layer 945 may be configured to compute labeling scores based on the combined feature vectors. Scoring layer 945 may also generate a set of output labels for each of the combined feature vectors. Scoring layer 945 may compute class scores for each combined feature vector using a feed forward layer. Scoring layer 945 may also apply a CRF to the class scores to compute the set of output labels.

Scoring layer 945 may include feed forward scoring layer 950 and CRF scoring layer 955. In some examples, a feed forward scoring layer 950 is configured to compute class scores based on the combined feature vector. In some examples, a CRF scoring layer 955 is configured to compute the labeling scores based on the class scores.

Command component 960 may identify an image editing command based on the set of word labels or on the labeling scores.

Training component 965 may compute a first loss value by comparing the set of output labels and the set of target labels. Training component 965 may also compute at least one additional loss value including at least one of: Training component 965 may also update the neural network 920 based on computed first loss value and the at least one additional loss value. In some examples, the first loss value is computed using a Viterbi loss algorithm.

Training component 965 may include mutual information component 970, context-based prediction component 975, and sentence-based prediction component 980. In some examples, the mutual information represents a loss value based on mutual information between word-based feature vectors and context-based feature vectors. In some examples, a mutual information loss value based on comparing mutual information between the combined feature vectors and corresponding context-based feature vectors.

Mutual information component 970 may also identify a context-based feature vector for each word of a first subset of text inputs and identify a random vector for each word of a second subset of text inputs. Mutual information component 970 may then train a binary mutual information classifier based on the context-based feature vectors and the random vectors. In some examples, the mutual information loss value is computed using the binary mutual information classifier.

In some examples, a context-based prediction loss value based on comparing context-based output labels and the target labels. In some examples, the context-based prediction represents a loss value based on max pooling over words in a text. Context-based prediction component 975 may also train a feed forward neural network 920 in order to compute the loss value. Context-based prediction component 975 may identify context-based feature vectors for the set of text inputs, and compute the context-based output labels using the feed forward neural network 920 based on the context labels.

Sentence-based prediction component 980 may also compute a sentence vector for each text input of the set of text inputs by max pooling over words in the text input. A sentence-based prediction represents a loss value based on a multi-label classification representing which labels are present in a text.

In some examples, a sentence-level prediction loss value based on comparing predicted label sets present in each of the text inputs with known label sets based on the target labels. Sentence-based prediction component 980 may also apply a feed forward neural network 920 to the sentence vectors to compute the predicted label sets present in each of the text inputs, where each of the predicted label sets includes a multi-label classification representing which labels are present in the corresponding text input.

Accordingly, the present disclosure includes the following embodiments.

A method and non-transitory computer readable medium storing code for editing images with verbal commands is described. Embodiments may include receiving an audible input for editing an image, converting the audible input to a text input, computing a combined feature vector for the text input, identifying a set of word labels for words of the text input using a neural network trained using multi-task learning with a loss function including a first loss value and an additional loss value based on mutual information, context-based prediction, or sentence-based prediction, and identifying an image editing command based on the set of word labels, and editing the image based on the image editing command.

In some examples, the set of word labels includes an action label, and object label, an attribute label, and a value label. In some examples, the mutual information represents a loss value based on mutual information between word-based feature vectors and context-based feature vectors.

In some examples, the context-based prediction represents a loss value based on max pooling over words in a text. In some examples, the sentence-based prediction represents a loss value based on a multi-label classification representing which labels are present in a text.

An apparatus for editing images with verbal commands is described. Embodiments of the apparatus may include an input component configured to identify a text input, a word embedding component configured to convert the text input into a set of word vectors, a feature encoder configured to create a combined feature vector for the text input based on the word vectors, a scoring layer configured to compute labeling scores based on the combined feature vectors, a command component configured identify an image editing command based on the labeling scores, and the feature encoder and the scoring layer are trained using multi-task learning with a loss function including a first loss value and an additional loss value based mutual information, context-based prediction, or sentence-based prediction. In some cases, the loss function may include three or more loss values.

In some examples, the set of word vectors comprise semantic information and Part-of-Speech (POS) information. In some examples, the feature encoder further comprises: a word encoder configured to compute a word-based feature vector, and a structural encoder configured to compute a structure-based feature vector, wherein the combined feature vector comprises the word-based feature vector and the structure-based feature vector.

In some examples, the word encoder comprises a 2-layer bi-directional Long Short Term Memory (LSTM). In some examples, the structural encoder comprises a Graph Convolutional Network (GCN).

In some examples, the scoring layer further comprises: a feed forward scoring layer configured to compute class scores based on the combined feature vector, and a Conditional Random Field (CRF) scoring layer configured to compute the labeling scores based on the class scores.

A method and non-transitory computer readable medium storing code for editing images with verbal commands is described. Embodiments may include receiving a training set comprising a plurality of text inputs and a set of target labels for each of the plurality of text inputs, generating a combined feature vector for each of the plurality of text inputs, generating a set of output labels for each of the combined feature vectors, computing a first loss value by comparing the set of output labels and the set of target labels, computing at least one additional loss value comprising at least one of: a mutual information loss value based on comparing mutual information between the combined feature vectors and corresponding context-based feature vectors, a context-based prediction loss value based on comparing context-based output labels and the target labels, a sentence-level prediction loss value based on comparing predicted label sets present in each of the text inputs with known label sets based on the target labels, and updating the neural network based on computed first loss value and the at least one additional loss value.

Some examples of the method and non-transitory computer readable medium described above may further include embedding each word of the plurality of text inputs into a word embedding space. Some examples may further include identifying a POS tag for each of the words. Some examples may further include computing a word-based feature vector using a word encoder based on the embedded words and the identified POS tags. Some examples may further include computing a structure-based feature vector using a structural encoder. Some examples may further include combining the word-based feature vector and context-based feature vector to produce the combined feature vector.

Some examples of the method and non-transitory computer readable medium described above may further include computing class scores for each combined feature vector using a feed forward layer. Some examples may further include apply a CRF to the class scores to compute the set of output labels. In some examples, the feed forward neural network comprises a 2-layer feed forward neural network and a logistic regression model. In some examples, the first loss value is computed using a Viterbi loss algorithm.

Some examples of the method and non-transitory computer readable medium described above may further include identifying a context-based feature vector for each word of a first subset of text inputs. Some examples may further include identifying a random vector for each word of a second subset of text inputs. Some examples may further include training a binary mutual information classifier based on the context-based feature vectors and the random vectors. In some examples, the mutual information loss value is computed using the binary mutual information classifier.

Some examples of the method and non-transitory computer readable medium described above may further include training a feed forward neural network. Some examples may further include identifying context labels for the plurality of text inputs. Some examples may further include computing the context-based output labels using the feed forward neural network based on the context labels.

Some examples of the method and non-transitory computer readable medium described above may further include computing a sentence vector for each text input of the plurality of text inputs by max pooling over words in the text input. Some examples may further include apply a feed forward neural network to the sentence vectors to compute the predicted label sets present in each of the text inputs, wherein each of the predicted label sets comprises a multi-label classification representing which labels are present in the corresponding text input. In some examples, the word encoder comprises a sequential encoder.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on."

What is claimed is:

1. A system including an artificial neural network (ANN) for image editing, the system comprising:
    a processor and a memory including computer program code, the memory and the computer program code configured to, with the processor, cause the system to convert text input into a set of word vectors;
    a feature encoder of the ANN configured to create a combined feature vector for the text input based on the set of word vectors;
    a scoring layer of the ANN configured to compute labeling scores based on the combined feature vector, wherein the feature encoder, the scoring layer, or both are trained using multi-task learning with a loss function including a first loss value and an additional loss value, wherein the additional loss value is based on mutual information, context-based prediction, or sentence-based prediction;
    a command component configured to identify an image editing command based on the labeling scores; and
    an image editing application configured to edit an image based on the image editing command.

2. The system of claim 1, wherein:
    the set of word vectors comprise semantic information and Part-of-Speech (POS) information.

3. The system of claim 1, wherein the feature encoder further comprises:
    a word encoder configured to compute a word-based feature vector; and
    a structural encoder configured to compute a structure-based feature vector, wherein the combined feature vector comprises the word-based feature vector and the structure-based feature vector.

4. The system of claim 3, wherein:
    the word encoder comprises a 2-layer bi-directional Long Short Term Memory (LSTM).

5. The system of claim 3, wherein:
    the structural encoder comprises a Graph Convolutional Network (GCN).

6. The system of claim 1, wherein the scoring layer further comprises:
    a feed forward scoring layer configured to compute class scores based on the combined feature vector; and
    a Conditional Random Field (CRF) scoring layer configured to compute the labeling scores based on the class scores.

7. A method for training a neural network, comprising:
    receiving a training set comprising a plurality of text inputs and a set of target labels for each of the plurality of text inputs;
    generating a combined feature vector for each of the plurality of text inputs;
    generating a set of output labels for each of the combined feature vectors;
    computing a first loss value by comparing the set of output labels and the set of target labels;
    computing at least one additional loss value based on context information; and
    updating the neural network based on the first loss value and the at least one additional loss value.

8. The method of claim 7, further comprising:
    embedding each word of the plurality of text inputs into a word embedding space;
    identifying a Part-of-Speech (POS) tag for each of the words;
    computing a word-based feature vector using a word encoder based on the embedded words and the identified POS tags;
    computing a structure-based feature vector using a structural encoder; and
    combining the word-based feature vector and context-based feature vector to produce the combined feature vector.

9. The method of claim 7, further comprising:
    computing class scores for each combined feature vector using a feed forward layer; and
    applying a Conditional Random Field (CRF) to the class scores to compute the set of output labels.

10. The method of claim 9, wherein:
    the feed forward neural network comprises a 2-layer feed forward neural network and a logistic regression model.

11. The method of claim 10, wherein:
    the first loss value is computed using a Viterbi loss algorithm.

12. The method of claim 7, further comprising:
    identifying a context-based feature vector for each word of a first subset of text inputs;
    identifying a random vector for each word of a second subset of text inputs; and
    training a binary mutual information classifier based on the context-based feature vectors for the each word of the first subset of text inputs and the random vectors, wherein a mutual information loss value is computed using the binary mutual information classifier.

13. The method of claim 7, further comprising:
    training a feed forward neural network;
    identifying context labels for the plurality of text inputs; and
    computing the output labels using the feed forward neural network based on the context labels.

14. The method of claim 7, further comprising:
    computing a sentence vector for each text input of the plurality of text inputs by max pooling over words in the text input; and
    applying a feed forward neural network to the sentence vectors to compute predicted label sets present in each of the text inputs, wherein each of the predicted label sets comprises a multi-label classification representing which labels are present in the corresponding text input.

15. The method of claim 7, wherein the at least one additional loss value comprises:
    a mutual information loss value based on comparing mutual information between the combined feature vectors and corresponding context-based feature vectors;
    a context-based prediction loss value based on comparing context-based output labels and the target labels; or
    a sentence-level prediction loss value based on comparing predicted label sets present in each of the text inputs with known label sets based on the target labels.

16. A method for image editing, comprising:
    receiving an audible input for editing an image;

converting the audible input to a text input;
computing a feature vector for the text input using a neural network;
computing a set of word labels based on the feature vector using the neural network, wherein the neural network is trained using multi-task learning with a loss function including a first loss value and an additional loss value based on mutual information, context-based prediction, or sentence-based prediction;
identifying an image editing command based on the set of word labels; and
editing the image based on the image editing command.

17. The method of claim 16, wherein:
the set of word labels includes an action label, an object label, an attribute label, or a value label.

18. The method of claim 16, wherein:
the mutual information represents a loss value based on mutual information between word-based feature vectors and context-based feature vectors.

19. The method of claim 16, wherein:
the context-based prediction represents a loss value based on max pooling over words in a text.

20. The method of claim 16, wherein:
the sentence-based prediction represents a loss value based on a multi-label classification representing which labels are present in a text.

* * * * *